Oct. 14, 1930.    J. F. PAGENDARM    1,778,430
HEADLAMP MOUNTING
Filed Jan. 23, 1929
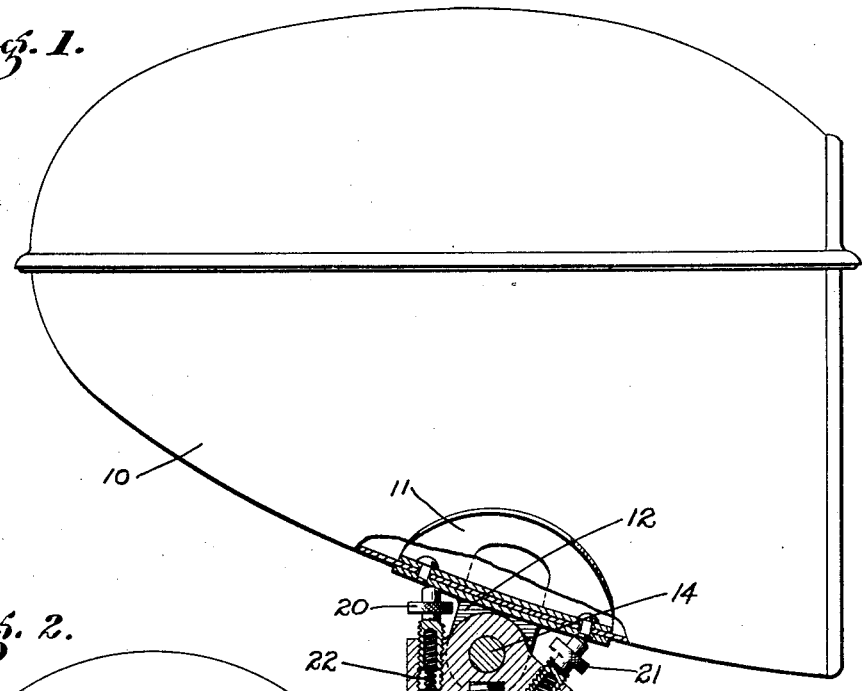
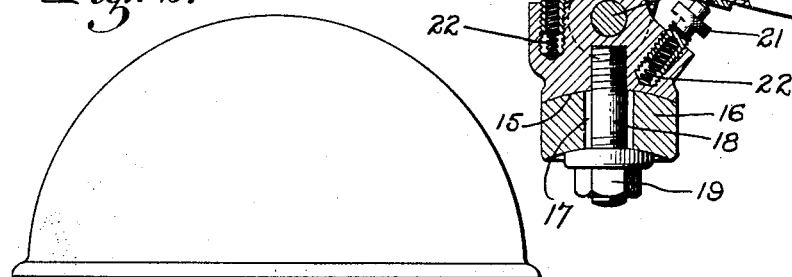
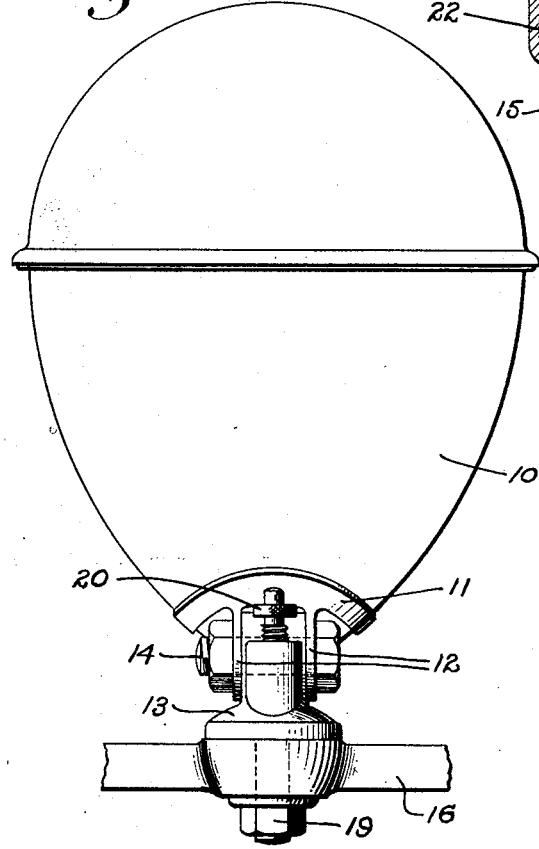
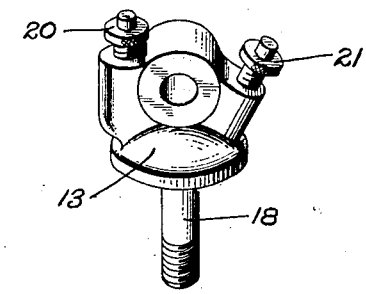
INVENTOR.
John F. Pagendarm.
BY
Townsend, Loftus & Affett
ATTORNEYS.

Patented Oct. 14, 1930

1,778,430

UNITED STATES PATENT OFFICE

JOHN F. PAGENDARM, OF OAKLAND, CALIFORNIA, ASSIGNOR TO AMERICAN WOODLITE CORPORATION, OF SAN FRANCISCO, CALIFORNIA, A CORPORATION OF CALIFORNIA

HEAD-LAMP MOUNTING

Application filed January 23, 1929. Serial No. 334,386.

My present invention relates to a new and improved type of headlamp mounting.

The principal object of my invention is to provide a new and improved type of headlamp mounting which is simple, practical, and efficient in operation and one which may be cheaply manufactured.

Another object of my invention is to provide a novel type of headlamp mounting which will permit of minute adjustments of the headlamp upon its support.

A further object of my invention is to provide in an adjustable headlamp mounting, means whereby, when the adjustment of the headlamp is made, the parts will be securely held against loosening due to vibration.

Another object of my invention is to provide an adjusting means for headlamps whereby the elevation of the light beam may be varied vertically without disturbing the other adjustment of the lamp.

At the present time it is customary to mount vehicle headlamps upon a support by means of a spherical and concave surface so that the headlamp may be adjusted in any direction upon its support to give the proper angle of projection. In mountings of this character, resort is generally had to a single clamping screw which projects through the spherical and concave surfaces so as to clamp the two surfaces securely together. This arrangement provides for a universal adjustment of the headlamp within the limits provided, but in this device it is difficult to obtain an adjustment of the headlamp in the vertical plane without interfering with its adjustment in the horizontal plane, and I therefore propose to provide by my invention a support for the headlamp which will permit of minute adjustment in its vertical plane without disturbing its adjustment in the horizontal plane. It is a well known fact that headlamp mountings are subjected to a considerable amount of vibration and because of this fact it often happens that the headlamp body becomes loose upon its support and, as a result, out of proper adjustment. In order to provide against a loosening of the headlamp, as suggested above, I have provided in connection with my improved adjustable support, a means which will hold the movable parts thereof against displacement due to vibration.

For a better understanding of my invention, reference should be had to the accompanying drawing wherein I have shown by way of illustration, a preferred embodiment of the essential features of my invention.

In the drawing—

Fig. 1 is a side elevation, partially in section, showing my bracket applied to a headlamp suitable for vehicles, Fig. 2 is a fragmentary, elevational view taken from the rear of the headlamp shown in Fig. 1, and Fig. 3 is a perspective view of the supporting portion of my improved mounting.

In the drawing 10 designates a portion of a headlamp suitable for vehicles. The body portion 10 is shown as having a member 11 secured thereto as by riveting or welding so that it forms a part of the headlamp structure. This member 11 is provided with a pair of downwardly projecting ears 12 which project outwardly from the bottom of the headlamp body 10. These ears 12 are so spaced that they project downwardly along opposite sides of a supporting member 13 so that when a shaft or bolt 14 is passed therethrough, the ears 12 may be securely clamped to the member 13 so that the headlamp will be movable upon the support 13 in one plane only, this plane being vertical with respect to the headlamp proper. The supporting member 13 is shown in this instance as having a concave surface 15 which engages a spherical surface carried by a portion of the vehicle body designated in the drawings by the numeral 16, this portion 16 being in the present instance in the form of the usual cross arms which extend in advance of the radiator between the front fenders of the vehicle. The member 16 adjacent its spherical portions is provided with a hole 17 through which a stud 18 secured in the member 13 projects and upon which a nut 19 is threaded so as to secure the parts together. It will be understood that the sphercial and concave surfaces referred to above can be dispensed with and the contacting surfaces made flat.

In addition to the above features of construction, I provide by my invention means for adjusting the headlamp in its vertical plane about the shaft 14. This means comprises screws 20 and 21 which are arranged on opposite sides of the shaft or bolt 14. In the present instance these two screws are shown as projecting radially with respect to each other and adapted to engage the member 11 carried by the headlamp housing so that as the screws are turned, the headlamp may be adjusted and secured in its proper position upon the shaft 14. Owing to the fact that these adjusting screws may be subjected to considerable vibration, I have also provided a means which will hold them in their adjusted position so that they cannot become loosened as a result of such vibration. This feature of my invention is accomplished by providing the screws 20 and 21 with a recess in their inner ends into which a spring 22 may be seated, the spring being of such a length that it will extend out of the ends of the screws 20 and 21 and contact with the bottom of the threaded opening into which these screws project. With this arrangement the threads of the screws 20 and 21 will be held into tight frictional engagement with the threads upon the supporting member 13 and thus they will be held against accidental turning.

From the above it will be seen that I have provided a new and improved type of headlamp mountnig which is simple, practical and efficient and one in which adjustments of the headlamp may be readily made with a minimum of inconvenience; and while I have shown the headlamp as mounted above the supporting bracket, I desire to have it understood that the position of these parts may be reversed and still operate with equal facility; and while I have shown by way of illustration a preferred embodiment thereof, I aim to cover in the appended claims all embodiments which fall within the spirit and scope thereof.

Having thus described my invention, what I claim and desire to secure by Letters Patent is—

1. A device of the character described, comprising a rigid support, a head lamp pivotally secured thereto, and a pair of screws adjustably carried by said support at their lower ends and engaging said head lamp at their upper ends for adjusting the position of the head lamp.

2. In a mounting for vehicle headlamps and the like, a universal joint, means for holding said universal joint in desired adjusted relationship of parts thereof, a headlamp pivotally mounted for rotation on a part of said universal joint, and adjusting screws mounted on said universal joint on opposite sides of said pivotal mounting to contact with said lamp and hold it in adjusted position.

3. In a mounting for vehicle headlamps and the like, a universal joint, means for holding said universal joint in desired adjusted relationship of parts thereof, a headlamp pivotally mounted for rotation in exactly one plane on a part of said universal joint, and adjusting screws mounted on said universal joint on opposite sides of said pivotal mounting to contact with said lamp and hold it in adjusted position.

4. In a mounting for vehicle headlamps and the like, a universal joint, means for holding said universal joint in desired adjusted relationship of parts thereof, a headlamp pivotally mounted for rotation in exactly one plane on a part of said universal joint, adjusting screws mounted on said universal joint on opposite sides of said pivotal mounting to contact with said lamp and hold it in adjusted position, and means to hold said screws in adjusted position on mere adjustment of said screws.

JOHN F. PAGENDARM.